Dec. 29, 1925.  
C. E. MURRAY  
1,567,454  
ANTISKID BRAKE FOR VEHICLES  
Filed Dec. 27, 1923

Patented Dec. 29, 1925.

1,567,454

UNITED STATES PATENT OFFICE.

CHARLES E. MURRAY, OF LOS ANGELES, CALIFORNIA, ASSIGNOR OF ONE-HALF TO JOHN C. NUNNALLY, OF LOS ANGELES, CALIFORNIA.

ANTISKID BRAKE FOR VEHICLES.

Application filed December 27, 1923. Serial No. 683,023.

*To all whom it may concern:*

Be it known that I, CHARLES E. MURRAY, a citizen of the United States, residing at Los Angeles, in the county of Los Angeles and State of California, have invented new and useful Improvements in Antiskid Brakes for Vehicles, of which the following is a specification.

My present invention being referred to as an antiskid brake for vehicles, it may be understood to be an object of this invention to provide means for bringing a motor vehicle, or the like, to a sudden stop by means directly engaging the ground or a pavement over which a vehicle may be advancing.

It is an object of this invention to provide means for promptly and reliably interposing a shoe or a pair of shoes, preferably arcuate in outline, between the wheels or tires of a vehicle and a pavement, each of the mentioned arcuate shoes being preferably pivoted in proximity to but eccentrically from a wheel axle, in such manner as to facilitate the application and release of said brake.

It is a further object of this invention to provide an anti-skid brake shoe with rollers or their equivalent, permitting a relative movement of a wheel thereon.

It is a further object of this invention to provide an anti-skid brake shoe with a removable and replaceable ground-engaging element, this element being preferably wedge shaped in longitudinal section, and provided with a serrated or otherwise roughened surface.

It is a further object of this invention to provide an anti-skid brake mounted upon a bracket extending forwardly from an axle in such manner as to cause the shoe of said brake to swing out of contact with said wheel when elevated and into contact therewith when depressed or released, the downward movement of said shoe being preferably limited both by its engagement with a wheel and by flexible restraining means, such as a chain or cable connected with the frame of a vehicle.

It is a further object of this invention to provide an anti-skid brake with means normally retaining the same in an inoperative position but permitting the release and application thereof, under the action of gravity and frictional engagement with a wheel or tire, the mentioned restraining and releasing means preferably comprising a hook connected with a foot pedal; and in the preferred embodiment of my invention the mentioned shoe may be provided with returning means comprising a reach rod connected at one end with an arm to which said shoe is rigidly secured and at its other end with a lever, the last mentioned lever being either provided with an operating handle or so positioned relatively to an emergency brake lever, or the like, as to permit of its control thereby.

Other objects of my invention will appear from the following description of a preferred embodiment thereof, taken in connection with the appended claims and the accompanying drawing, in which:

Figure 1 is a generalized or diagrammatic side view of a motor vehicle sufficiently complete to show the intended relationships between the parts of my present invention, my novel brake being shown as in an inoperative position.

Figure 2 is a similar view, but showing my brake as applied.

Figure 3 may be regarded as a rear view, taken from the direction of the arrow 3, Figure 2.

Figure 4 is a detailed view showing a preferred type of ground-engaging element and its relationships to a shoe in which it may be embodied, this view being taken substantially on the line 4—4 of Figure 5.

Figure 5 is a plan view with parts broken away showing additional details of a preferred construction of my novel brake shoe.

Referring to the details of that specific embodiment of my invention which I have chosen for purposes of illustration, 1 being the frame of a motor vehicle, and 2 being the rear wheels thereof, shown as mounted upon axles 3, extending through housings 4, 5 may be a bracket rigidly secured relatively thereto by means such as bolts 6, bracket 5 being shown as formed in two parts, 5ª and 5ᵇ, to facilitate assembling in the relationships indicated in Figures 1, 2 and 3.

The brackets 5 being intended to provide suitable mountings for pivots 7 upon which arms 8 carrying brake shoes 9 are mounted in proximity to but eccentrically of the axles 3, and the pivots 7 being preferably arranged slightly above and in advance of said axles, the mentioned shoes 9, carrying ground-engaging elements 10 may normally occupy the inoperative position illustrated in Figure 1, although free to swing when released and under the action of gravity into the operative position shown in Figure 2.

Although the shoes 9 may be of any suitable construction, I prefer to form each of these shoes from a pair of side plates 10$^a$, 10$^b$, spaced apart by means such as bolts 11, shown as provided not only with exterior heads 12 and nuts 13 but also with interior or spacing nuts 14, 14', the action of these bolts being preferably supplemented by additional bolts 15 carrying not only the nuts or washers 16 but sleeves or rollers 17, capable of free rotation upon the bolts 15, in a manner permitting a wheel supported thereby to continue its rotative movement even after a vehicle may have been brought to a complete stop by the action of the ground-engaging element 10 in contact with a road surface or pavement.

The ground-engaging surface 10 may be of any suitable or preferred construction and retained in any advantageous manner, my preferred construction comprises a plate which is somewhat wedge shaped in longitudinal sectioned outline although deeply serrated on its lower surface 18, channels 19 receiving the edges of the plate 10, and any suitable means, such as the locking strap 20 shown as retained by one of the bolts 15, being provided to prevent a longitudinal or rearward displacement of the said ground-engaging element.

By the construction referred to it will be obvious that, the arm 8 being rigidly secured to the shoe 9, the action of gravity, and the frictional engagement of a wheel or tire therewith, may suffice to swing the shoe 9, upon the releasing of a reach rod 21, pivotally connected at 22 to an arm 23, rigidly connected with the arm 8 upon which the shoe 9 is mounted, into the relative position shown in Figure 2, thereby bringing a vehicle to an immediate stop regardless of a continued rotation of the rear wheels thereof, in consequence of the momentum of the engine and parts driven thereby.

Although any preferred alternative means might be employed to retain or restore the mentioned movable parts of my novel anti-skid brake, I consider it advantageous to secure one end of the rod 21 to a forward lever 24, shown as pivoted at 25 to a bracket 26; and although this lever may optionally be provided directly with a handle, suitable for the manipulation of my brake by the means disclosed, I consider it advantageous to provide the inner or upper end of this forward lever with a projection 27, adapted to be engaged and retained by any suitable means permitting a prompt release and application of my brake under the action of gravity and in the manner already described. My preferred retaining and releasing means comprises a foot pedal 28, shown as extending through the floor of a motor vehicle and pivoted beneath the same at 29, this pedal being shown as integral with a hook 30, elevated by the depression of the pedal 28 in such manner as immediately and completely to release the forward lever 24, with the results already mention; and, when I employ the construction just described, I may optionally so position parts referred to that the projection 27, upon the lever 24, or another suitable projection or engaging means provided thereon, may extend within the path of or otherwise be engaged by a usual lever provided upon automobiles of current design, such as an emergency brake lever 31 shown as pivoted at 32 in such manner that a movement suitable to the application of the emergency brake by a brake rod 31' may be effective to restore my anti-skid brake to its inoperative position,—in which position it may be retained by means such as the automatic engagement of projection 27 with the hook 30. Although, by reason of the eccentric mounting already described, the rearward movement of the shoe 9, engaging the wheel 2, may be regarded as automatically self-limited, in order to avoid undue strain upon the parts referred to I may optionally associate therewith flexible connecting means such as a chain or cable 33, shown as secured at its inner and upper end to the frame 1 and at its lower end to the shoe 9.

The manner of operating the anti-skid brake is as follows:

When the emergency brake lever 31 is pulled backward, it engages the projection 27 on the lever 24 which is forced back into engagement with the hook 30 on the foot pedal 28. This action draws forward the reach rod 21 which, through its connection with the arm 23 and the arm 8, elevates the shoe 9 into the position shown in Fig. 1. When the foot pedal 28 is pressed downwardly the hook 30 becomes disengaged from the projection 27 and the shoe falls by gravity to the ground. As the arm 8 is pivoted at 7 eccentric to the axle of the wheel, the shoe is drawn under the wheel which rides upon the rollers 17 so that the vehicle wheel may still be driven by the engine while the shoe acts as a brake. The chain or cable 33 limits the rearward movement of the shoe.

Although I have herein shown and described one complete advantageous embodiment of my invention, it will be understood that various features thereof might be independently employed and also that various modifications might be made therein, without involving a departure from the spirit and scope of my invention, as the same is indicated above and in the following claims.

What I claim is:

1. A drag-shoe for vehicles comprising in combination an axle, a wheel on the axle, a housing for the axle, an arm pivoted to the housing, a drag shoe rigidly attached to the arm, a rod connected to the arm, a lever to operate the rod and thereby swing the arm and shoe upward, a trip to engage the lever, means to disengage the trip and allow the shoe to drop by gravity to a position between the ground and the wheel, a projection on the lever and a brake lever engaging therewith to operate the lever.

2. A drag-shoe for vehicles having a shoe, rollers thereon adapted to engage a vehicle wheel and allow its rotation on the rollers, an arm rigidly attached to the shoe, a second arm attached to the first arm, a reach rod pivotally connected to the second arm, a pivoted lever having one end connected to the reach rod, a projection on said lever, a trip device to engage said projection and an emergency brake lever to engage the projection and operate the lever to elevate the drag-shoe.

In testimony whereof I have signed my name to this specification.

CHARLES E. MURRAY.